US005983482A

United States Patent [19]

[11] Patent Number: 5,983,482

[45] Date of Patent: Nov. 16, 1999

Kawatani et al.

[54] METHOD FOR PROCESSING SHAFT FOR HUB UNIT AND METHOD FOR PRODUCING THE SHAFT

[75] Inventors: Teruyuki Kawatani; Koichi Shimizu, both of Kashiwara, Japan

[73] Assignee: Koyo Seiko Co., Ltd., Japan

[21] Appl. No.: 09/018,075

[22] Filed: Feb. 3, 1998

[30] Foreign Application Priority Data

Feb. 4, 1997 [JP] Japan .................................. 9-035636

[51] Int. Cl.[6] ...................................................... B23P 13/04

[52] U.S. Cl. ............................................. 29/557; 279/137

[58] Field of Search .............................. 29/557; 409/131, 409/132, 143; 279/137, 58; 451/49, 57, 385, 381

[56] References Cited

U.S. PATENT DOCUMENTS 4,429,925 2/1984 Orain ................................. 308/189 R 5,820,137 10/1998 Patterson ................................ 279/141

*Primary Examiner*—P. W. Echols

*Assistant Examiner*—John C. Hong

*Attorney, Agent, or Firm*—Adams & Wilks

[57] ABSTRACT

The present invention discloses to a processing method for a shaft for a hub unit comprising a shaft body portion 2 and a radial outward flange 3 provided on one end thereof. The processing method comprises the steps of: machining, on a root portion 5 of the flange 3, an internal diameter surface 7 and a side 8 of an annular portion 6 extending in a direction of axis X—X of the shaft body portion 2 and in a direction opposite to the shaft body portion 2; and clamping the internal diameter surface 7 with the side 8 of the annular portion 6 being a reference, in which clamped state a flange side 9 on the annular portion 5 side and an outer peripheral surface 10 of the shaft body portion are machine-finished.

12 Claims, 2 Drawing Sheets

3
9
5
1
10
8
6
B
4
X
X
A
7
2

22
22a
20
23
25
26
24
21a
27
28
30
29
21

METHOD FOR PROCESSING SHAFT FOR HUB UNIT AND METHOD FOR PRODUCING THE SHAFT

FIELD OF THE INVENTION

The present invention relates to a method for producing a shaft for a hub unit, for example, a hub unit for automobiles, and to a method for processing the shaft.

DESCRIPTION OF THE RELATED ART

A hub unit heretofore known is shown in FIG. 2. A shaft 20 has a shaft body portion 21 and a radial outward flange provided on one end thereof. A roller bearing 23 is mounted on an outer peripheral surface 21*a* of the shaft body portion 21 of the shaft 20 and fixed by means of a nut 24 threadedly mounted on an end of the shaft body portion 21. The flange 22 is formed at its root portion 25 with an annular portion 26 which extends in a direction opposite to the shaft body portion 21. The shaft 20 is formed by forging. An internal diameter face 27 of the annular portion 26 has a bevel face shape and, a rotating dog 28 which is formed during the forging process of the shaft 20. The flange 22 and the annular portion 26 are also formed during the forging process of the shaft 20. The rotating dog 28 is used when the flange 22 and an outer peripheral surface 21*a* of the shaft body portion 21 are subjected to machining or polishing with both center holes 29 and 30 being used as a references.

In this hub unit, the shaft 20 is processed by forging as described above. After that, processing is finished in one of two cases. In one case of which a side 22*a* of the flange 22 on the annular portion 26 side which constitutes a mounting surface relative to a mating member (not shown) and the outer peripheral surface 21*a* of the shaft body portion 21 which is a mounting surface of the roller bearing 23 are machined. In the other case, the side 22*a* of the flange 22 and the outer peripheral surface 21*a* of the shaft body portion 21 are polished after machining.

In the case where the machining is carried out, as shown in FIG. 3A, the center the holes 29 and 30 formed in opposite ends of the shaft body portion 21 are clamped by centers 31 and 32 of a machining device, and the shaft 20 is rotated through the dog 28 of the annular portion 26, whereby the flange side 22*a* and the outer peripheral surface 21*a* of the shaft body portion 21 are machined. In the case where the polishing operation is carried out, polishing is carried out in two steps as shown in FIG. 3A and FIG. 3B. That is, in FIG. 3A, the center holes 29 and 30 formed in opposite ends of the shaft body portion 21 are clamped by the centers 31 and 32 of the polishing device, and the shaft 20 is rotated through the dog 28 of the annular portion 26 to first polish the flange side 22*a,* thus completing the first step. Subsequently, in the second step, as shown in FIG. 3B, the flange side 22*a* after polishing is supported by a packing plate 33 and received by a shoe 34, and the outer peripheral surface 21*a* of the shaft body portion 21 is polished with the flange side 22*a* being a reference.

In the above-described processing methods, the following problem sometimes occurs unless the management of the processing reference is sufficiently carried out. That is, in the machining, in the case where the axes of the center holes 29 and 30 formed in the opposite ends of the shaft body portion 21, the flange side 22*a* and the outer peripheral surface 21*a* of the shaft body portion 21 are machined without being attended by stable rotation. Therefore, a deflection of the flange side 22*a* relative to the shaft body portion 21 cannot be suppressed.

Further, since the polishing operation is carried out in two steps, in the case where polishing is carried out in the state in which, in the second step, foreign matter is moved in and between the flange side 22*a* and the packing plate 33, there occurs a problem in that a right-angled degree between the flange side 22*a* and the axis of the shaft body portion 21 fails to be maintained, so that the deflection of the flange side 22*a* relative to the shaft body portion 21 cannot be suppressed.

SUMMARY OF THE INVENTION

An object of the present invention is to provide a method for producing a shaft for a hub unit.

Another object of the present invention is to provide a method for processing the shaft which is capable of suppressing a deflection of a flange relative to a shaft body portion of the shaft.

The methods for producing and processing a shaft for a hub unit according to the present invention are as follows.

A method for producing a shaft for a hub unit according to the present invention comprises the steps of providing a shaft having a shaft body portion and a flange extending radially outward from the shaft body portion, and forming an annular portion extending from an end of the shaft body portion. The annular portion is machined to form an inner diameter surface and an annular end surface. The shaft is then supported by clamping the inner diameter surface and the annular end surface of the annular portion. Thereafter, an outer peripheral surface of the shaft body portion and a surface of the flange are machine-finished while the shaft is in the clamped state.

A method for processing a shaft for a hub unit comprises the steps of machining an annular portion of the shaft to form an inner diameter surface and an annular end surface, and supporting the shaft by clamping the inner diameter surface and the annular end surface of the annular portion of the shaft. Thereafter, an outer peripheral surface of the shaft body portion and a side surface of the flange are machine-finished while the shaft is in the clamped state.

In the methods for producing and processing the shaft for the hub unit according to the present invention, the deflection of the flange relative to the shaft body portion can be suppressed by the constitution as described above. Further, since no center holes are formed in opposite ends of the shaft body portion, there provides an effect that the number of processing steps for forming the center holes are reduced.

DETAILED DESCRIPTION OF THE PREFERRED EMBODIMENTS

One embodiment of the present invention will be described hereinafter with reference to the drawings. The construction of the entire hub unit is generally the same as FIGS. 2, 3A and 3B described above in connection with the conventional apparatus except that both the center holes 29, 30 and the rotating dog 28 are not formed. Therefore, a duplicate explanation is omitted and only the portion of the processing method for the shaft for the hub unit according to the present invention will be explained.

Figure 1:
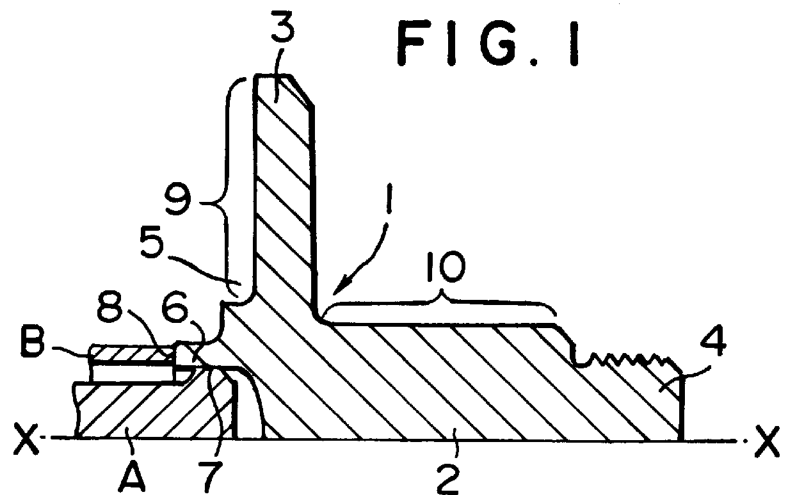
FIG. 1 is an explanatory view of a processing method for a shaft for a hub unit according to one embodiment of the present invention.
Figure 2:
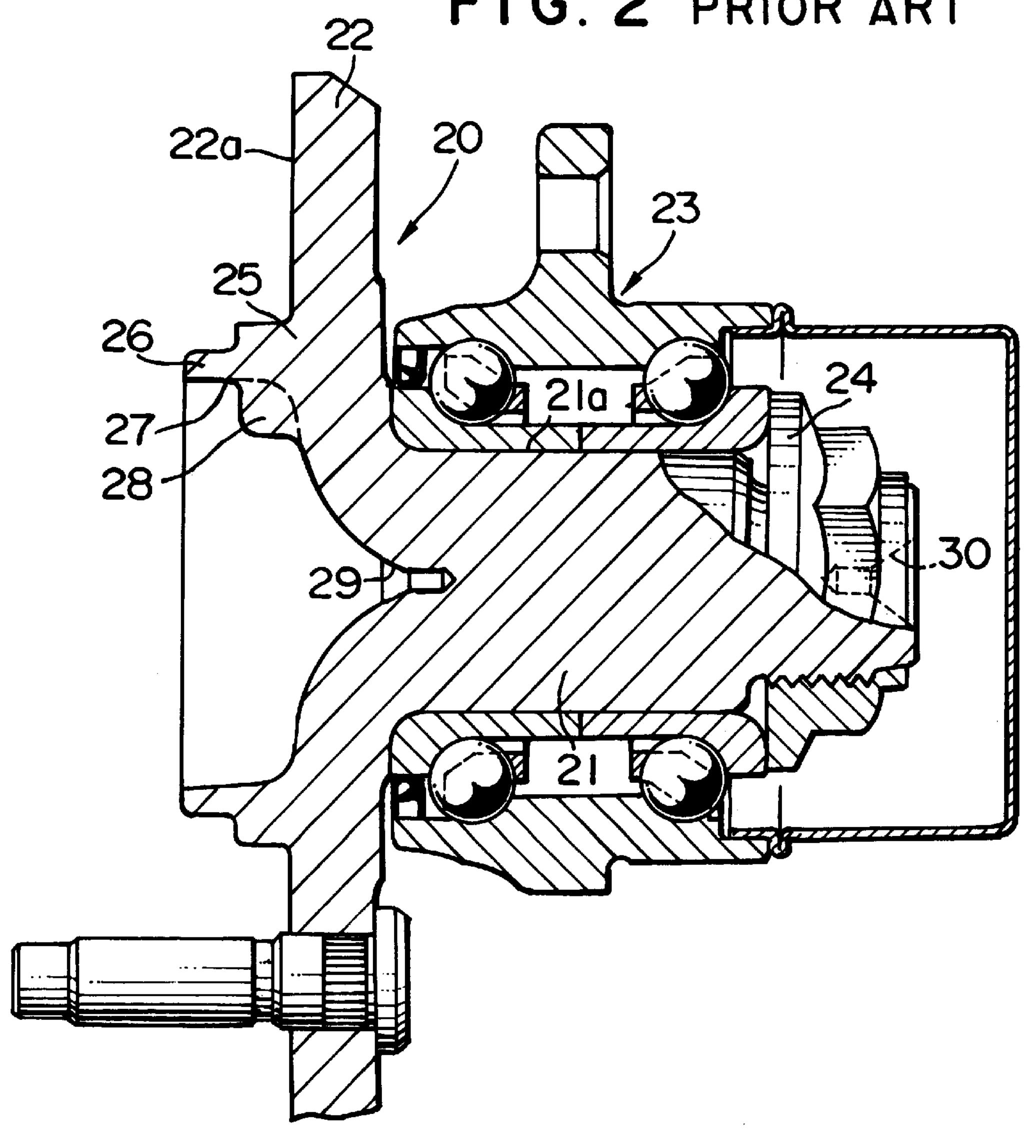
FIG. 2 is a sectional view of a conventional hub unit.
Figure 3A:
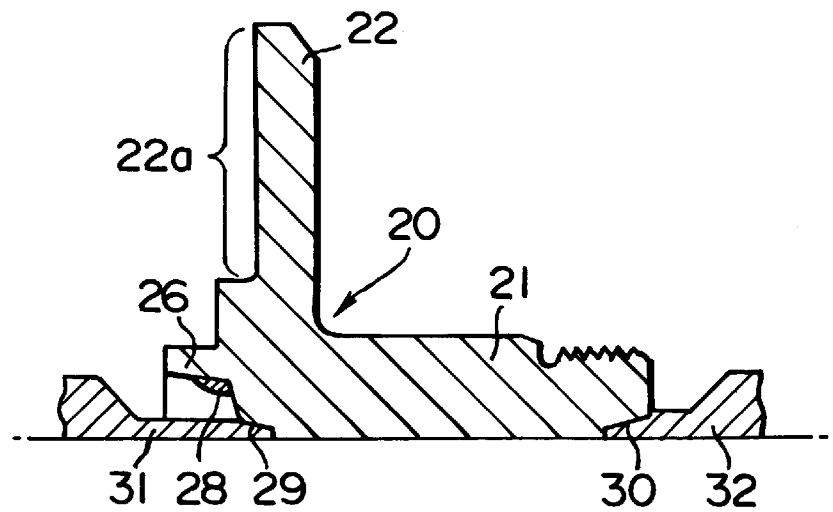
FIGS. 3A and 3B are respectively explanatory views of a processing method for a shaft for a hub unit according to the prior art.
Figure 3B:
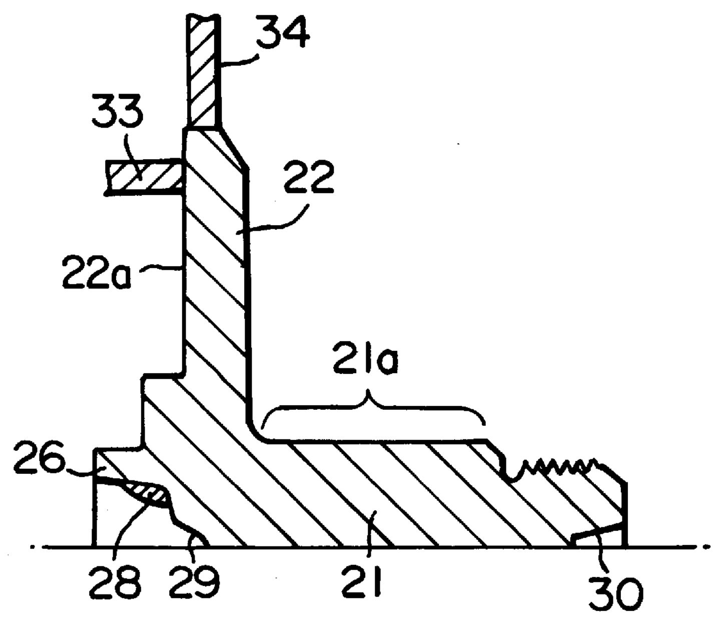

Referring to FIG. 1, a shaft 1 for a hub unit has a shaft body portion 2 and a flange 3 disposed on one end thereof and extending radially outward therefrom. A roller bearing 23 is mounted on an outer peripheral surface 10 of the shaft body portion 2 of the shaft 1, as shown in FIG. 2, and fixed by means of a nut 24 threadedly mounted on a thread portion 4 in the end of the shaft body portion 2. The flange 3 is formed at its root portion 5 with an annular portion 6 extending in a direction of axis X—X of the shaft body portion 2 and in a direction opposite to the shaft body portion 2. An internal diameter surface 7 and an annular surface or side 8 of the annular portion 6 are machined after the shaft 1 has been forged. Preferably, the internal diameter surface 7 of the annular portion 6 is formed parallel with the axis X—X, and the side 8 of the annular portion 6 is formed vertically to the axis X—X.

After this, the side 8 of the annular portion 6 is supported by a jig B so that the internal diameter portion 7 is clamped by a jig A with the side 8 being a reference. In this clamped state, a side 9 (a mounting surface onto a mating member not shown) of the flange 3 on the side of the annular portion 6 and an outer peripheral surface 10 of the shaft body portion 2 are machine-finished.

The deflection of the flange 3 relative to the shaft body portion 2 can be suppressed merely by the machining as described. As an incidental effect, it is possible to omit the polishing.

Further, since center holes are not formed in opposite ends of the shaft body portion 2 of the shaft 1, as in the shaft of the conventional apparatus, the processing of the center holes is not necessary, thereby reducing the number of processing steps.

We claim:

1. A method for processing a shaft for a hub unit, the shaft having a shaft body portion extending along a longitudinal axis thereof, an annular portion extending from an end of the shaft body portion along the longitudinal axis, and a flange disposed on the end of the shaft body portion and extending radially outward therefrom, the method comprising the steps of:

machining the annular portion of the shaft to form an inner diameter surface and an annular end surface;

supporting the shaft by clamping the inner diameter surface and the annular end surface of the annular portion of the shaft; and machine-finishing an outer peripheral surface of the shaft body portion and a side surface of the flange while the shaft is in the clamped state.

2. A method for processing a shaft for a hub unit according to claim 1; including machine-finishing the outer peripheral surface of the shaft body portion and the surface of the flange without forming center holes in opposite ends of the shaft body portion.

3. A method for processing a shaft for a hub unit according to claim 1; wherein the step of machining the annular portion of the shaft includes forming the inner diameter surface of the annular portion to extend in a direction generally parallel to the longitudinal axis.

4. A method for processing a shaft for a hub unit according to claim 3; wherein the step of machining the annular portion of the shaft includes forming the annular end surface of the annular portion to extend in a direction generally perpendicular to the longitudinal axis.

5. A method for processing a shaft for a hub unit according to claim 4; including machine-finishing the outer peripheral surface of the shaft body portion and the surface of the flange without forming center holes in opposite ends of the shaft body portion.

6. A method for processing a shaft for a hub unit according to claim 1; wherein the supporting step comprises clamping the inner diameter surface and the annular end surface of the annular portion of the shaft using separate clamping jigs.

7. A method for producing a shaft for a hub unit, comprising the steps of:

providing a shaft having a shaft body portion and a flange extending radially outward from the shaft body portion;

forming an annular portion extending from an end of the shaft body portion;

machining the annular portion to form an inner diameter surface and an annular end surface;

supporting the shaft by clamping the inner diameter surface and the outer annular surface of the annular portion; and machine-finishing an outer peripheral surface of the shaft body portion and a surface of the flange while the shaft is in the clamped state.

8. A method for producing a shaft for a hub unit according to claim 7; wherein the flange has an upper end and a lower end, the surface of the flange being machine-finished extending between the upper end and the lower end; and wherein the forming step includes forming the annular portion to extend from the lower end of the flange.

9. A method for producing a shaft for a hub unit according to claim 7; wherein the shaft body portion extends along a longitudinal axis; and wherein the step of machining the annular portion includes forming the inner diameter surface to extend in a direction generally parallel to the longitudinal axis.

10. A method for producing a shaft for a hub unit according to claim 9; wherein the step of machining the annular portion includes forming the annular end surface to extend in a direction generally perpendicular to the longitudinal axis.

11. A method for producing a shaft for a hub unit according to claim 7; including machine-finishing the outer peripheral surface of the shaft body portion and the surface of the flange without forming center holes in opposite ends of the shaft body portion.

12. A method for producing a shaft for a hub unit according to claim 7; wherein the supporting step comprises clamping the inner diameter surface and the annular end surface of the annular portion using separate clamping jigs.

* * * * *